(12) United States Patent
Ehrlich et al.

(10) Patent No.: US 9,703,699 B2
(45) Date of Patent: Jul. 11, 2017

(54) HYBRID-HDD POLICY FOR WHAT HOST-R/W DATA GOES INTO NAND

(71) Applicant: KABUSHIKI KAISHA TOSHIBA, Tokyo (JP)

(72) Inventors: Richard M. Ehrlich, Saratoga, CA (US); Eric R. Dunn, Cupertino, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 50 days.

(21) Appl. No.: 14/489,365

(22) Filed: Sep. 17, 2014

(65) Prior Publication Data

US 2016/0077962 A1 Mar. 17, 2016

(51) Int. Cl.
*G06F 12/00* (2006.01)
*G06F 12/02* (2006.01)
*G06F 3/06* (2006.01)

(52) U.S. Cl.
CPC ........... *G06F 12/0246* (2013.01); *G06F 3/06* (2013.01); *G06F 3/0613* (2013.01); *G06F 3/0655* (2013.01); *G06F 3/0679* (2013.01); *G06F 3/0688* (2013.01); *G06F 12/0238* (2013.01); *G06F 2206/1014* (2013.01); *G06F 2212/7201* (2013.01); *G06F 2212/7202* (2013.01); *G06F 2212/7207* (2013.01)

(58) Field of Classification Search
CPC .............. G06F 12/0246; G06F 3/0688; G06F 2206/1014; G06F 3/0613; G06F 3/0655; G06F 3/0679; G06F 2212/214; G06F 2212/7201; G06F 2212/7202; G06F 2212/7207; G06F 12/0238

USPC ....................................... 711/103; 360/48, 55
See application file for complete search history.

(56) References Cited

U.S. PATENT DOCUMENTS

| 8,239,645 | B1 | 8/2012 | Sade et al. | |
|---|---|---|---|---|
| 2010/0232048 | A1* | 9/2010 | Aida | G11B 5/09 360/48 |
| 2013/0166816 | A1 | 6/2013 | Atkisson et al. | |
| 2014/0201429 | A1* | 7/2014 | Tal | G06F 12/0246 711/103 |
| 2014/0258588 | A1* | 9/2014 | Tomlin | G06F 12/0246 711/103 |
| 2015/0062743 | A1* | 3/2015 | Horn | G06F 3/0647 360/55 |

(Continued)

*Primary Examiner* — Mardochee Chery
(74) *Attorney, Agent, or Firm* — Patterson & Sheridan, LLP

(57) ABSTRACT

In a cache policy for a hybrid drive having a magnetic storage device and a non-volatile solid-state device, the hybrid drive is configured to write the most recent version of data associated with a logical block address to the non-volatile solid-state device when the logical block address is associated with previously written data and is overlapped by a subsequent disk write operation. Advantageously, the most recent version of data associated with the overlapped logical block address is stored in cache in the non-volatile solid-state device, even when the subsequent disk write operation results in the overlapped logical block address being trimmed from cache or otherwise invalidated. Consequently, data associated with the overlapped logical block address can be accessed more quickly than data written to the magnetic storage device.

10 Claims, 12 Drawing Sheets

(56) References Cited

U.S. PATENT DOCUMENTS

2015/0142860 A1* 5/2015 George ............ G06F 17/30312
                                                                               707/812

\* cited by examiner

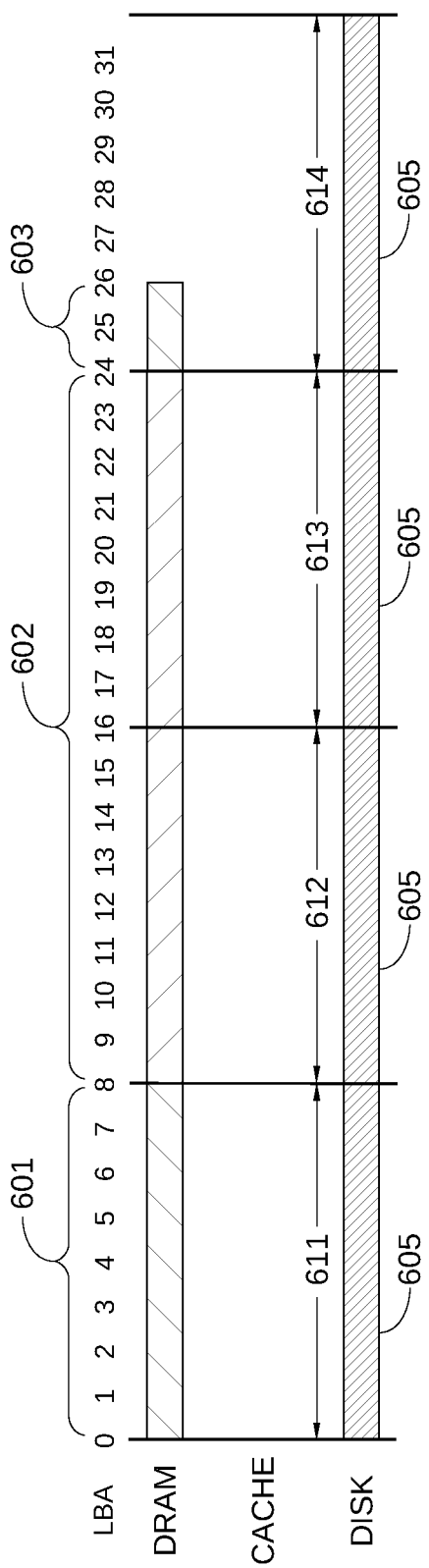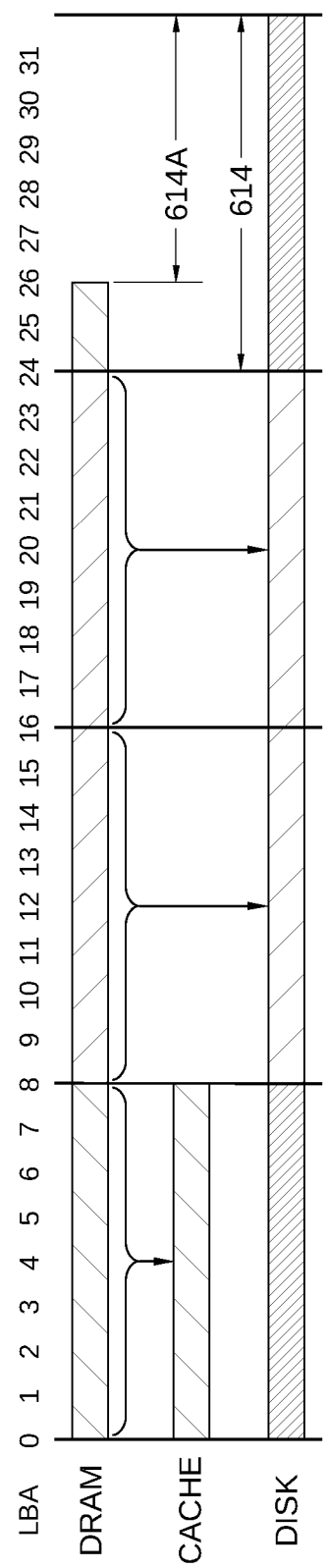

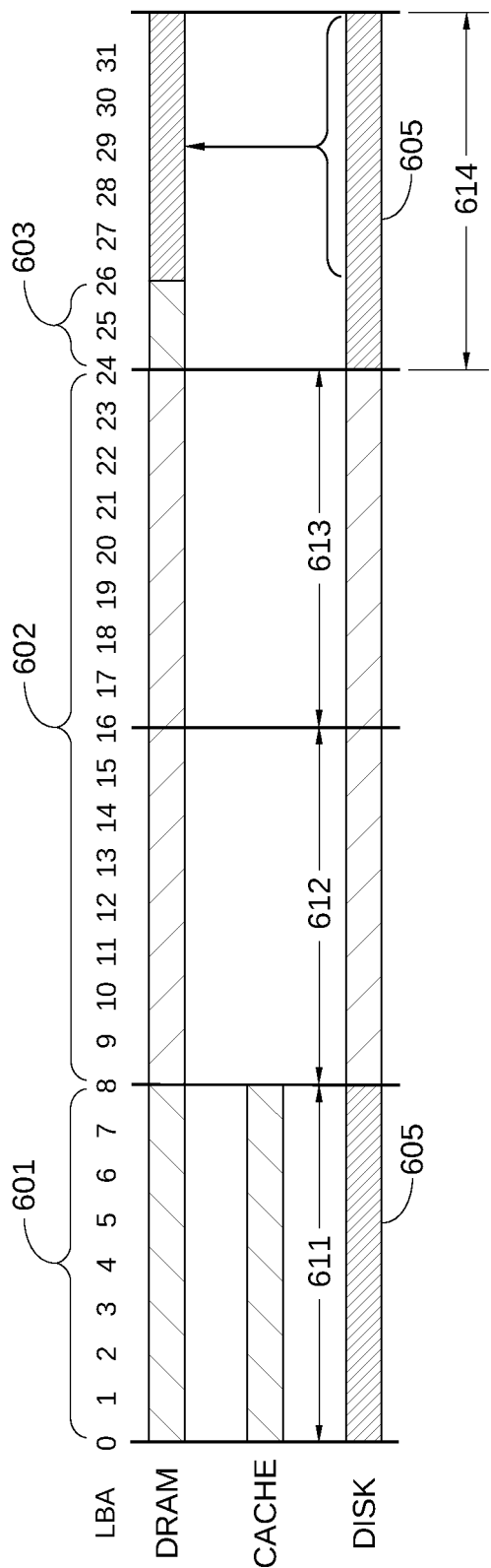
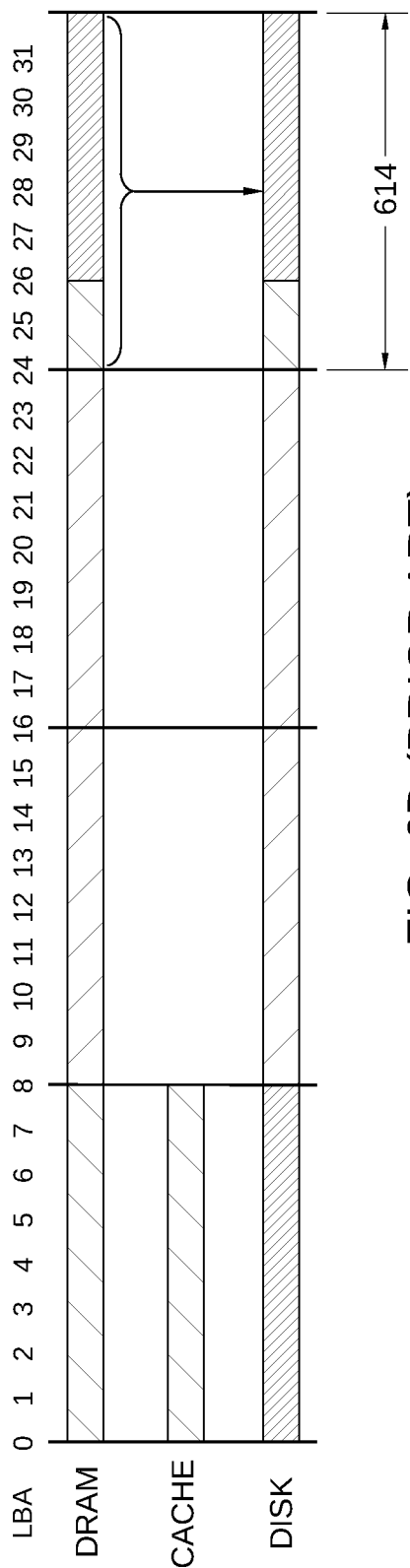
FIG. 6C (PRIOR ART)
FIG. 6D (PRIOR ART)

US 9,703,699 B2

HYBRID-HDD POLICY FOR WHAT HOST-R/W DATA GOES INTO NAND

BACKGROUND

Hybrid hard disk drives (HDDs) include one or more rotating magnetic disks combined with non-volatile solid-state (e.g., flash) memory. Generally, a hybrid HDD has both the capacity of a conventional HDD and the ability to access data as quickly as a solid-state drive, and for this reason hybrid drives are well-suited for use in laptop computers. For example, non-volatile solid-state memory in a hybrid drive may be employed as a very large cache for the hybrid drive, where data in the hybrid drive that are the most likely to be accessed again by a host are stored in such a cache. Typically, data associated with logical block addresses (LBAs) that are the most frequently and/or the most recently accessed by a host are retained in the cache of a hybrid drive. In this way, a large portion of the LBAs accessed by the host are typically accessed without the latency associated with reading from or writing to the magnetic disks.

Because the magnetic disk or disks of a hybrid drive generally have much more capacity than that of the non-volatile solid-state memory of the drive, only a fraction of the data stored on the magnetic disks can be cached in the non-volatile solid-state memory. Thus, various cache policies may be employed for determining exactly which LBAs are retained in the cache located in the non-volatile solid-state portion of the drive. Unfortunately, there are instances in which cache policies intended to improve performance of a hybrid drive can have the opposite effect. For example, when a long write stream is written to the magnetic disk of a hybrid drive, any LBAs that are stored in the non-volatile solid-state memory and are overlapped by the write stream are generally "trimmed" from the non-volatile solid-state memory (flagged as no longer stored in the non-volatile solid-state memory). Consequently, even though these LBAs were considered likely to be accessed again by the host and therefore were retained in cache, the act of storing the most recent version of data associated with such LBAs on the magnetic disk results in said LBAs being removed from cache. In this way, LBAs that are likely to be accessed again by the host are removed from cache, despite the inclusion of the removed LBAs in the most recent access to the drive.

SUMMARY

One or more embodiments provide systems and methods for a cache policy in a hybrid drive that includes a magnetic storage medium and a non-volatile solid-state device. The hybrid drive is configured to write the most recent version of data associated with a logical block address to the non-volatile solid-state device when the logical block address is associated with previously written data and is overlapped by a subsequent disk write operation. In other embodiments, the hybrid drive is configured to store in the non-volatile solid-state device a tail portion of a write command that is not aligned with a physical disk sector of the magnetic storage device.

A data storage device, according to embodiments, comprises a magnetic storage medium, a non-volatile solid-state device, and a controller. In one embodiment, the controller is configured to receive a write command that includes a logical block address and write data associated with the logical block address, determine that previously written data are stored in the non-volatile solid-state device that are associated with the logical block address, and, in response to determining that the previously written data stored in the non-volatile solid-state device are associated with the logical block address, store the write data in the non-volatile solid-state device.

Further embodiments provide a method of operating, in at least one of two modes of operating a storage device having a magnetic storage device and a non-volatile solid-state device. The method comprises the steps of receiving a write command that includes a logical block address and write data associated with the logical block address, determining that previously written data are stored in the non-volatile solid-state device that are associated with the logical block address, and, in response to determining that the previously written data stored in the non-volatile solid-state device are associated with the logical block address, storing the write data in the non-volatile solid-state device.

A data storage device, according to embodiments, comprises a magnetic storage medium, a non-volatile solid-state device, and a controller. In one embodiment, the controller is configured to receive data to be written in units of host sectors, the data including a head portion, a middle portion, and tail portion, and to write the head portion of the data into the non-volatile solid-state device, the middle portion of the data into the magnetic storage device, and the tail portion of the data into the non-volatile solid-state device.

BRIEF DESCRIPTION OF THE DRAWINGS

FIGS. 6A-6D are conceptual illustrations of a range of LBAs for which associated data are stored in a hybrid drive that includes a flash memory device and a magnetic disk.

DETAILED DESCRIPTION

Figure 1:
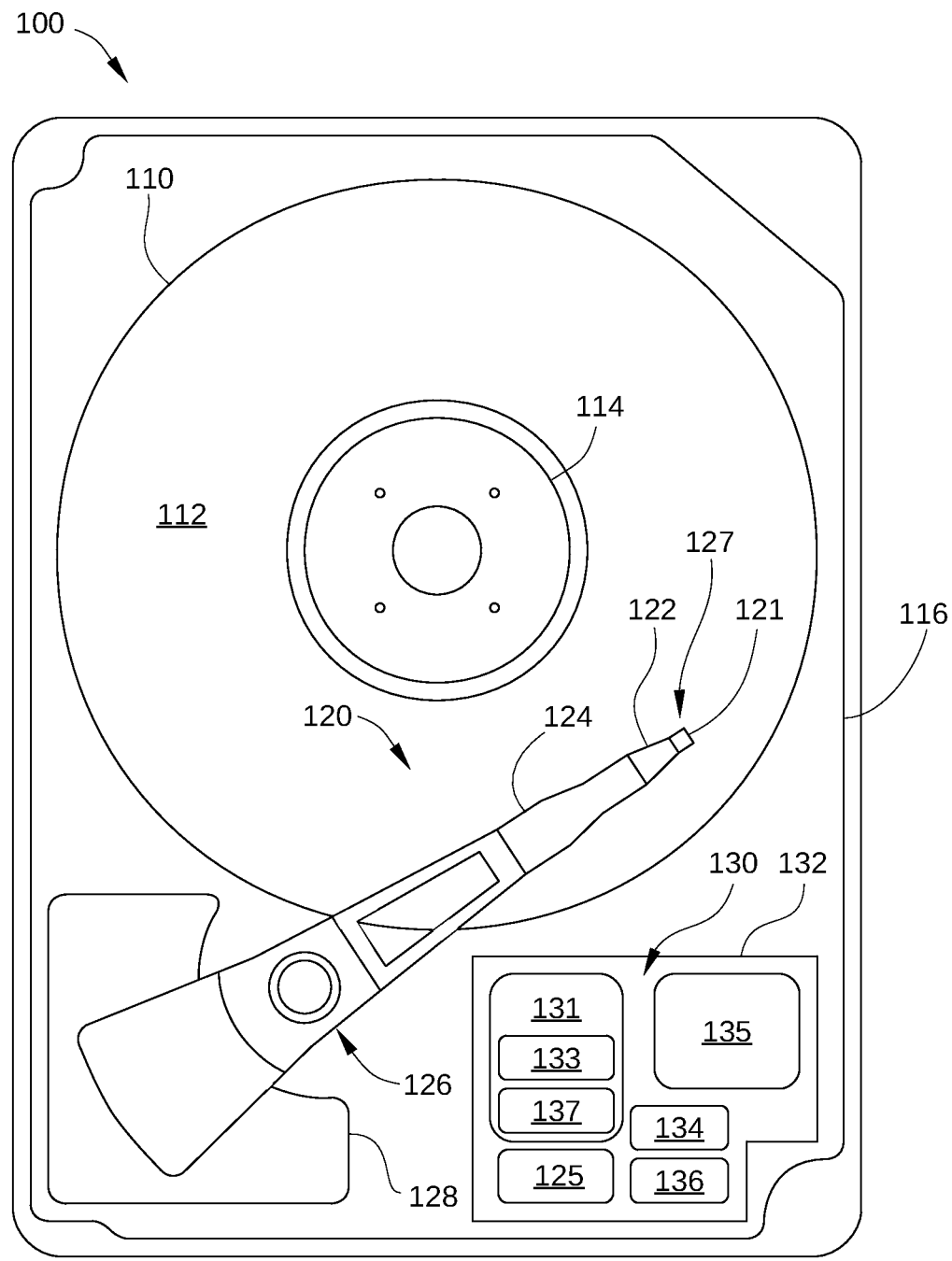
FIG. 1 is a schematic view of a hybrid drive according to an embodiment.

FIG. 1 is a schematic view of a hybrid drive according to an embodiment. For clarity, hybrid drive 100 is illustrated without a top cover. Hybrid drive 100 includes at least one magnetic disk 110 that is rotated by a spindle motor 114 and includes a plurality of concentric data storage tracks. Spindle motor 114 is mounted on a base plate 116. An actuator arm assembly 120 is also mounted on base plate 116, and has a slider 121 mounted on a flexure arm 122 with a read/write head 127 that reads data from and writes data to the data storage tracks. Flexure arm 122 is attached to an actuator arm 124 that rotates about a bearing assembly 126. Voice coil motor 128 moves slider 121 relative to magnetic disk 110, thereby positioning read/write head 127 over the desired concentric data storage track disposed on the surface 112 of magnetic disk 110. Spindle motor 114, read/write head 127, and voice coil motor 128 are coupled to electronic circuits 130, which are mounted on a printed circuit board 132. Electronic circuits 130 include a read/write channel 137, a microprocessor-based controller 133, random-access memory (RAM) 134 (which may be a dynamic RAM and is used as a data buffer), and/or a flash memory device 135 and flash manager device 136. In some embodiments, flash manager device 136, read/write channel 137, and/or microprocessor-based controller 133 are included in a single chip, such as a system-on-chip 131. In some embodiments, hybrid drive 100 may further include a motor-driver chip 125, which accepts commands from microprocessor-based controller 133 and drives both spindle motor 114 and voice coil motor 128.

For clarity, hybrid drive 100 is illustrated with a single magnetic disk 110 and a single actuator arm assembly 120. Hybrid drive 100 may also include multiple storage disks and multiple actuator arm assemblies. In addition, each side of magnetic disk 110 may have an associated read/write head coupled to a flexure arm.

When data are transferred to or from magnetic disk 110, actuator arm assembly 120 sweeps an arc between an inner diameter (ID) and an outer diameter (OD) of magnetic disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to magnetic disk 110. Voice coil motor 128 is coupled with a servo system known in the art that uses the positioning data read from servo wedges on magnetic disk 110 by read/write head 127 to determine the position of read/write head 127 over a specific data storage track. The servo system determines an appropriate current to drive through the voice coil of voice coil motor 128, and drives said current using a current driver and associated circuitry.

Hybrid drive 100 is configured as a hybrid drive, and in normal operation data can be stored to and retrieved from magnetic disk 110 and/or flash memory device 135. In a hybrid drive, non-volatile memory, such as flash memory device 135, supplements the spinning magnetic disk 110 to provide faster boot, hibernate, resume and other data read-write operations, as well as lower power consumption. To that end, a major portion of flash memory device 135 may be configured as a cache for hybrid drive 100, storing data that are the most frequently and/or the most recently accessed by a host, even when such data are also stored on magnetic disk 110. Such a hybrid drive configuration is particularly advantageous for battery-operated computer systems, such as mobile computers or other mobile computing devices. In a preferred embodiment, flash memory device 135 is a non-volatile solid state storage medium, such as a NAND flash chip that can be electrically erased and reprogrammed, and is sized to supplement magnetic disk 110 in hybrid drive 100 as a non-volatile storage medium. For example, in some embodiments, flash memory device 135 has data storage capacity that is orders of magnitude larger than RAM 134, e.g., gigabytes (GB) vs. megabytes (MB).

Figure 2:
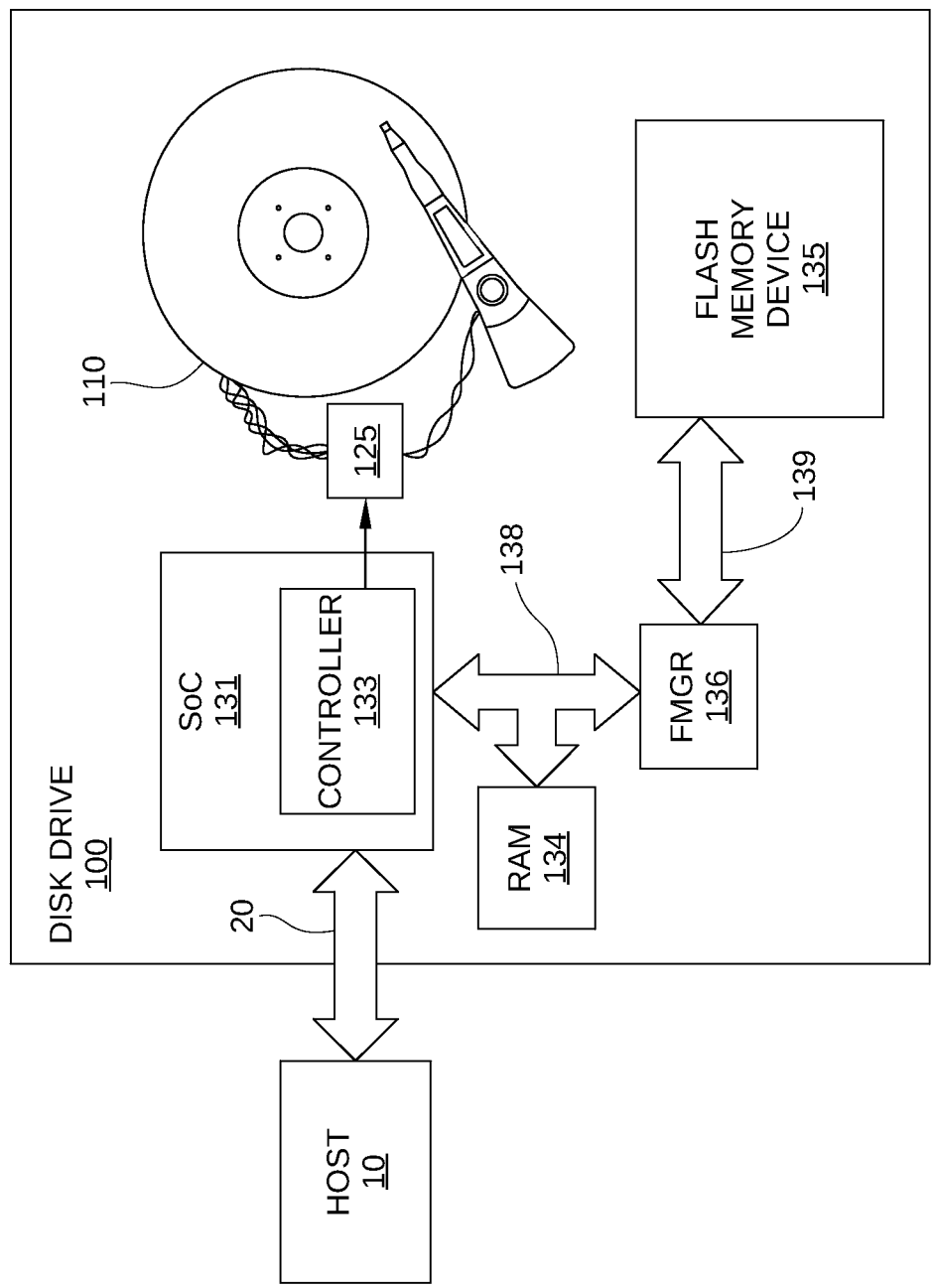
FIG. 2 is a block diagram of the hybrid drive according to the embodiment.

FIG. 2 is a block diagram of the hybrid drive according to an embodiment. As shown, hybrid drive 100 includes RAM 134, flash memory device 135, a flash manager device 136, system-on-chip 131, and a high-speed data path 138. Hybrid drive 100 is connected to a host 10, such as a host computer, via a host interface 20, such as a serial advanced technology attachment (SATA) bus.

In the embodiment illustrated in FIG. 2, flash manager device 136 controls interfacing of flash memory device 135 with high-speed data path 138 and is connected to flash memory device 135 via a NAND interface bus 139. System-on-chip 131 includes microprocessor-based controller 133 and other hardware (including read/write channel 137) for controlling operation of hybrid drive 100, and is connected to RAM 134 and flash manager device 136 via high-speed data path 138. In alternative embodiments, flash memory device 135 may be formed as part of system-on-chip 131. In such an embodiment, the flash manager device might have its own data path (not shown in FIG. 2), and not share a data path with the RAM 134. Microprocessor-based controller 133 is a control unit that may include one or more microcontrollers such as an ARM microprocessor, a hybrid drive controller, and any control circuitry within hybrid drive 100. High-speed data path 138 is a high-speed bus known in the art, such as a double data rate (DDR) bus, a DDR2 bus, a DDR3 bus, or the like.

As noted above, some or most of flash memory device 135 may be configured as a cache for hybrid drive 100, storing data in hybrid drive 100 that are the most frequently and/or the most recently accessed by host 10. Such data are generally the most likely data to be requested again by host 10, and, being stored in flash memory device 135, can be provided to host 10 much more quickly and with less energy expenditure than data that are retrieved from magnetic disk 110. Various cache policies may be employed for determining exactly which logical block addresses (LBAs) are retained in the cache located in the flash memory device 135.

One cache policy for hybrid drive 100 involves storing in cache only an initial portion of any sequential read stream (a series of read commands that forms a group of sequential LBAs) or write stream (a series of write commands that forms a group of sequential LBAs) received from host 10. Thus, according to such a policy, data received as part of a sequential read stream or write stream are stored in flash memory device 135 until the quantity of data from the read or write stream that is stored exceeds a predetermined threshold. The remaining data received as part of the sequential read or write stream is then stored on magnetic disk 110. For example, the first two megabytes (MB) of each sequential read stream and the first MB of each sequential write stream received from host 10 may be stored in the non-volatile solid-state memory of the drive, while the remainder of each sequential read or write stream is stored on magnetic disk 110. Such a cache policy generally has improved performance relative to other cache policies when host 10 has a large "footprint" relative to the cache size, i.e., when the span of the data frequently accessed by host 10 significantly exceeds the storage capacity of flash memory device 135. This is because attempting to store all read and write streams from host 10 when host 10 has a large footprint results in "churn," in which the contents of the cache are generally replaced with more recently accessed data before they are ever used to satisfy a cache hit. Churning the cache contributes significantly to wear of flash memory device 135 without substantially improving performance of hybrid drive 100.

One drawback of the above-described cache policy is that, in some circumstances, data that have a high likelihood of being accessed by host 10 are removed from the cache in flash memory device 135 despite being favorable candidates for storage in cache. Specifically, data that have been recently accessed by host 10 multiple times, and therefore are more likely to be accessed again by host 10, may be trimmed, invalidated, or otherwise flagged as no longer stored in cache under certain circumstances, for example when a write command results in writing data to magnetic disk 110 that overlaps with LBAs currently stored in flash memory device 135. One such scenario is illustrated in FIGS. 3A-3C.

Figure 3A:
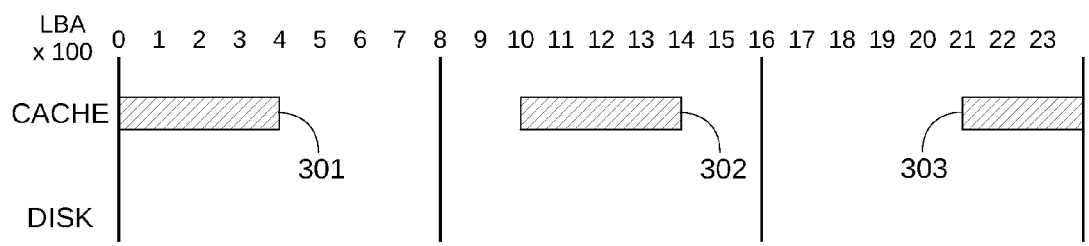
FIGS. 3A-3C are conceptual illustrations of a range of LBAs for which associated data are stored in a hybrid drive of the related art.
Figure 3B:
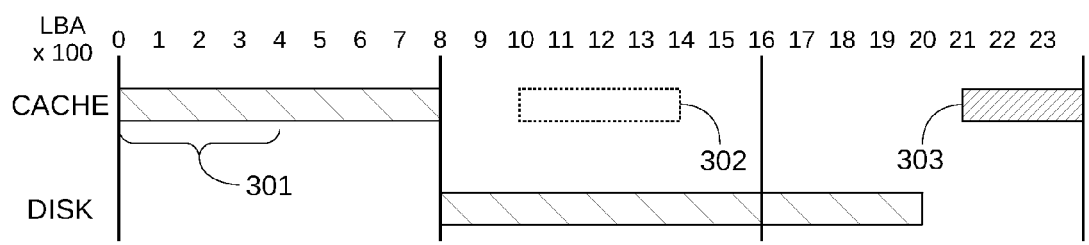
Figure 3C:
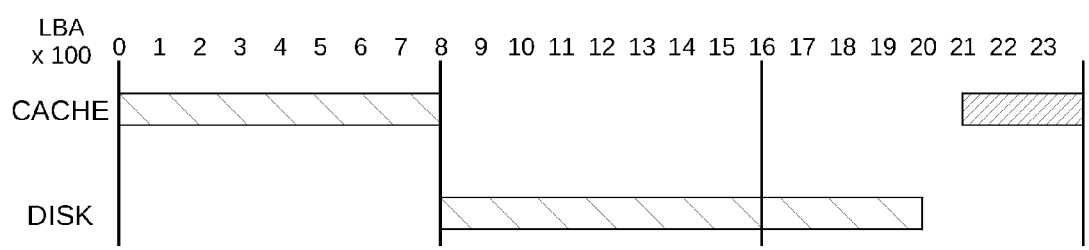

FIGS. 3A-3C are conceptual illustrations of a range of LBAs for which associated data are stored in a hybrid drive that includes a flash memory device and a magnetic disk. Each of LBAs 0-2399 is associated with a block of data, such as a 512-byte block or other-sized data block, that is stored in the hybrid drive. As discussed in further detail below, the most recent version of data associated with each of LBAs 0-2399 may be stored in cache for the hybrid drive (i.e., in the flash memory device) and/or on the magnetic disk.

FIG. 3A illustrates LBAs 0-2399 after three initial write commands received from host 10 have been performed, resulting in data being written to LBAs 0-399, 1000-1399, and 2100-2399. As shown, the data associated with these LBAs is only stored in cache, since each of these write commands spans a relatively short range of LBAs and therefore does not exceed the predetermined threshold for switching from writing to the flash memory device to writing to the magnetic disk. Thus, previously written data 301, 302, and 303 associated with these three groups of LBAs is stored in cache.

FIG. 3B illustrates LBAs 0-2399 after a disk write operation is performed in which data associated with LBAs 0-799 are written to the cache and LBAs 800-1999 are written to the magnetic disk. For example, LBAs 0-1999 may be associated with data included in a write command, where the data size exceeds a predetermined threshold for switching from writing to the flash memory device to writing to the magnetic disk. In the example illustrated in FIG. 3B, the threshold corresponds to the quantity of data associated with 800 LBAs. Thus, data associated with LBAs 0-799 are written to cache and LBAs 800-1999 are written to the magnetic disk. Consequently, previously written data 301, which are stored in cache, are associated with LBAs that are overwritten as the write command is executed, while previously written data 302, which are also stored in cache, are associated with LBAs that are overlapped by the LBAs included in the disk write operation (i.e., LBAs 1000-1399). Because a newer version of previously written data 302 now exists on the magnetic disk, previously written data 302, which are associated with the overlapped LBAs, are trimmed, invalidated, or otherwise flagged as no longer stored in the flash memory device.

FIG. 3C illustrates LBAs 0-2399 after previously written data 302 are trimmed, invalidated, or otherwise flagged as no longer stored in cache. Notably, the only valid data associated with 1000-1399 are stored on the magnetic disk and no data associated with LBAs 1000-1399 are stored in cache. So, despite the fact that these LBAs were recently stored in cache due to being accessed in the initial write commands and then accessed again in conjunction with a subsequent disk write operation, the only valid data associated with these LBAs is on the magnetic disk. In other words, although LBAs 1000-1399 may have been accessed more recently than LBAs 2100-2399 and more frequently than LBAs 400-999 and 1400-1999, the data associated with LBAs 1000-1399 are only stored on the magnetic disk. Because cache ideally stores the most recently and/or most frequently used data, trimming or invalidating of data associated with overlapped LBAs in this way is generally undesirable.

According to one or more embodiments, when a disk write operation results in data in flash memory device 135 being trimmed, invalidated, or otherwise flagged as no longer in use, the most recent version of data associated with such overlapped LBAs is also written to flash memory device 135. In this way, LBAs overlapped by a subsequent disk write operation still have valid data associated therewith in cache, and can be quickly accessed by host 10. One such embodiment is described in conjunction with FIGS. 4A-4C.

Figure 4A:
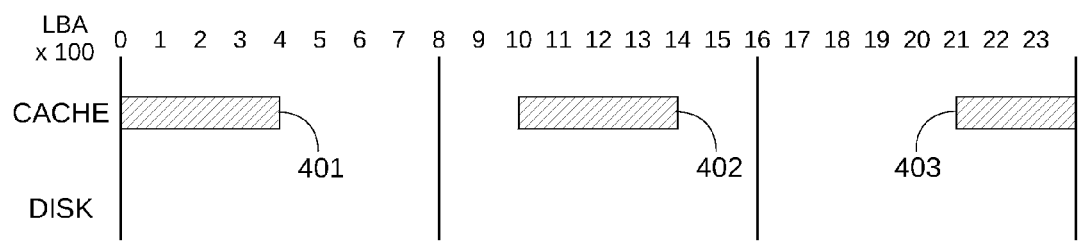
FIGS. 4A-4C are conceptual illustrations of a range of LBAs for which associated data are stored in the hybrid drive according to an embodiment.
Figure 4B:
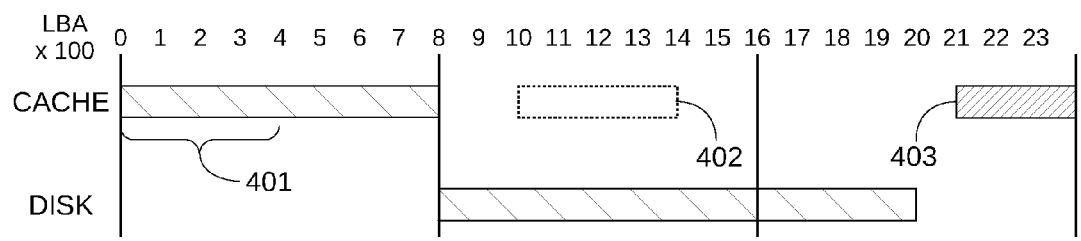
Figure 4C:
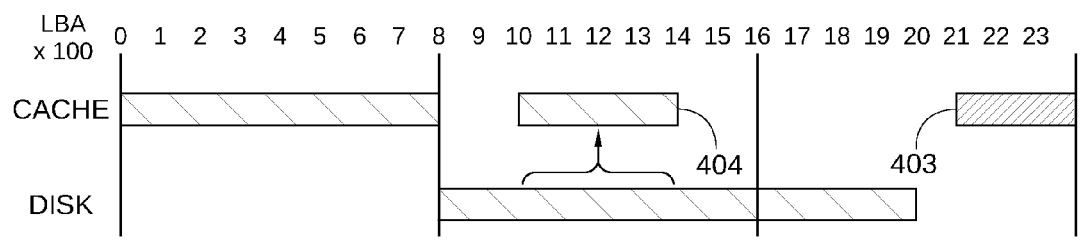

FIGS. 4A-4C are conceptual illustrations of a range of LBAs for which associated data are stored in the hybrid drive according to the embodiment. Each of LBAs 0-2399 is associated with a host sector of data, such as a 512-byte block or other-sized data block, that is stored in hybrid drive 100. As discussed in further detail below, the most recent version of data associated with each of LBAs 0-2399 may be stored in cache for hybrid drive 100 (i.e., in flash memory device 135) and/or on magnetic disk 110.

FIG. 4A illustrates LBAs 0-2399 after three initial write commands have been performed, resulting in data being written to LBAs 0-399, 1000-1399, and 2100-2399. As shown, previously written data 401, 402, and 403 associated with these LBAs is only stored in cache. The initial write commands may be received from host 10, or may be performed in response to one or more read commands in which data associated with LBAs 0-399, 1000-1399, and 2100-2399 are requested by host 10.

FIG. 4B illustrates LBAs 0-2399 after a disk write operation is performed in which data associated with LBAs 0-799 are written to cache and LBAs 800-1999 are written to magnetic disk 110. For example, LBAs 0-1999 may be associated with data included in a write command, where said data exceed a predetermined threshold for switching from writing to flash memory device 135 to writing to magnetic disk 110. Thus, data associated with LBAs 0-799 are written to cache and data associated with LBAs 800-1999 are written to magnetic disk 110. Consequently, previously written data 401, which are stored in cache, are associated with LBAs that are overwritten as the write command is executed, while previously written data 402, which are also stored in cache, are associated with LBAs that are overlapped by the LBAs included in the disk write operation (i.e., 1000-1399). Because a newer version of previously written data 402 now exists on magnetic disk 110, previously written data 402, which are associated with the overlapped LBAs, are trimmed, invalidated, or otherwise flagged as no longer stored in flash memory device 135.

FIG. 4C illustrates LBAs 0-2399 after the most recent data associated with overlapped LBAs (LBAs 1000-1399) have been written to cache for hybrid drive 100 (i.e., flash memory device 135). Conceptually, in FIG. 4C the most recent data 404 associated with the overlapped LBAs are shown being copied from magnetic disk 110 to cache. In practice, most recent data 404 are typically still present in RAM 134 of hybrid drive 100 when previously written data 402 are trimmed or otherwise invalidated. Consequently, the most recent version of data associated with the overlapped LBAs can generally be written directly to physical locations in flash memory device 135 from RAM 134 as most recent data 404.

Because the most recent data associated with overlapped LBAs 1000-1399 are stored in cache in addition to on magnetic disk 110, accesses to these LBAs by host 10 (i.e., reads from or writes to) can be completed much more quickly and with less energy expenditure than data that are retrieved from magnetic disk 110. For example, when read/write head 127 (shown in FIG. 1) is parked, time required to access LBAs 1000-1399 from magnetic disk 110 can be on the order of 300 ms or more, since read/write head 127 is loaded, seeks to the locations on magnetic disk 110 corresponding to LBAs 1000-1399, and then reads data from or writes data to these locations. In contrast, time required to read from or write to the physical memory locations in flash memory device 135 corresponding to LBAs 1000-1399 can be less than 1 ms. In addition, because LBAs 1000-1399 have been accessed at a higher recency and/or frequency than other data stored in hybrid drive 100, these LBAs are generally more likely to be accessed subsequently by host 10.

As shown in FIGS. 4B and 4C, previously written data 402 and most recent data 404 are associated with the same LBAs (LBAs 1000-1399). However, it is noted that, when flash memory device 135 includes NAND-type flash memory, data stored therein are generally written and read in blocks or pages, which are much larger than a single machine word (or byte). Because the input/output interface of NAND-type flash memory does not provide a random-access external address bus, there is not a fixed one-to-one correspondence between each physical memory location in flash memory device 135 and each LBA of hybrid drive 100. Consequently, the physical memory locations in flash memory device 135 of previously written data 402 are generally different than the physical memory locations in flash memory device 135 of most recent data 404. Thus, previously written previously written data 402 and most recent data 404 are associated with the same LBA space but not the same physical memory locations of flash memory device 135.

Figure 5:
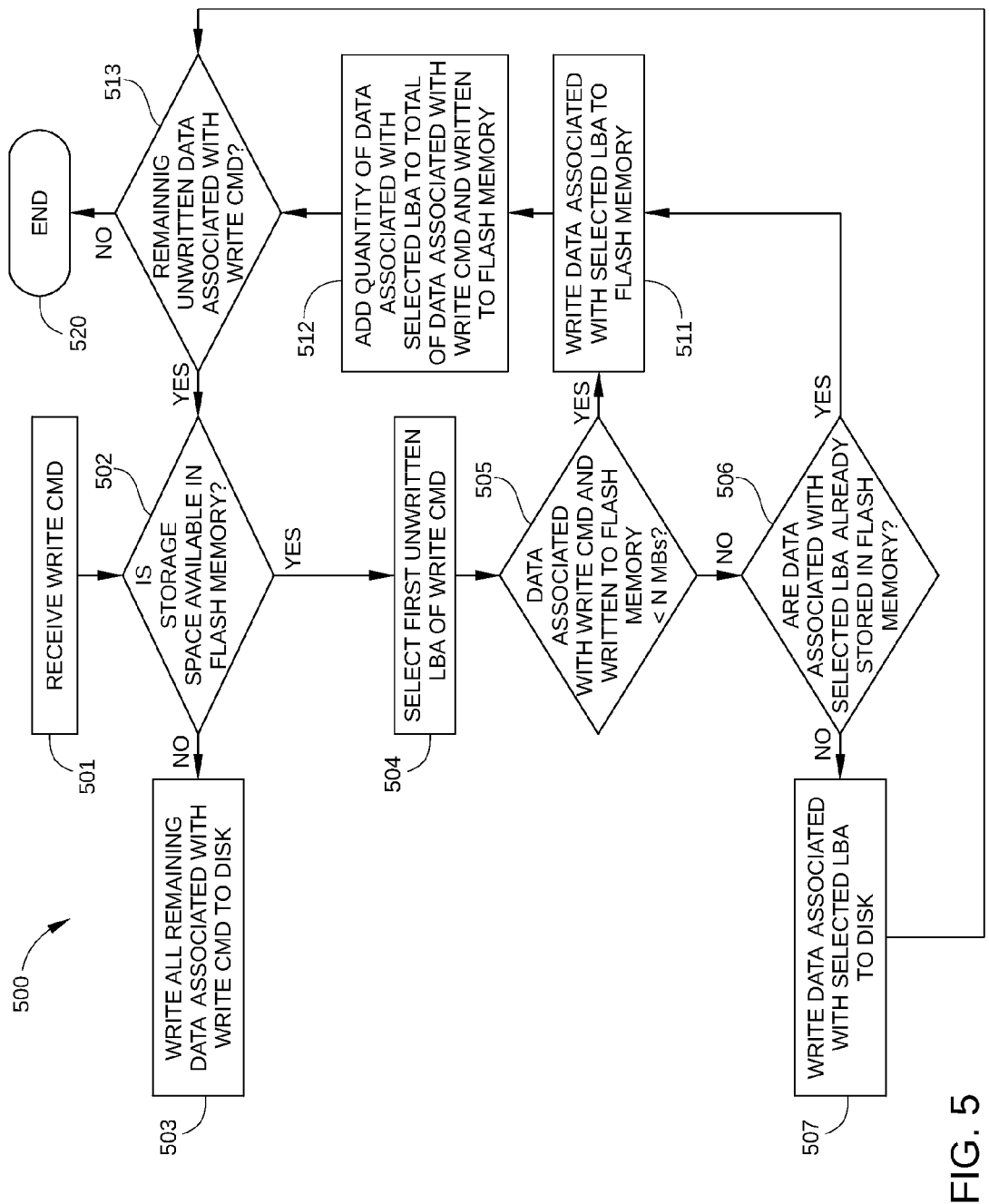
FIG. 5 sets forth a flowchart of method steps for performing a write operation in a hybrid drive according to an embodiment.

FIG. 5 sets forth a flowchart of method steps for performing a write operation in a hybrid drive according to the embodiment. Although the method steps are described in conjunction with hybrid drive 100 in FIGS. 1-2, persons skilled in the art will understand the method steps may be performed with other types of systems. While described below as performed by microprocessor-based controller 133, control algorithms for the method steps may reside in and/or be performed by any other suitable control circuit, system, or software or firmware construct associated with hybrid drive 100.

As shown, a method 500 begins at step 501, where microprocessor-based controller 133 receives a write command that includes an LBA and write data associated with the LBA from host 10. The write command so received may be the beginning of a sequential write stream (i.e., a write stream in which the write commands making up the write stream form a group of sequential LBAs), or a later portion of a sequential write stream. In some embodiments, microprocessor-based controller 133 receives the write command into RAM 134.

In step 502, microprocessor-based controller 133 determines if sufficient storage space is available in flash memory device 135 for the write data included in the write command received in step 501. If inadequate storage space is available in flash memory device, method 500 proceeds to step 503. If sufficient storage is available, method 500 proceeds to step 504. Step 502 may be performed after step 501 or after step 513 of method 500. It is noted that when performed after step 513, microprocessor-based controller 133 determines if sufficient storage space is available in flash memory device 135 for storing the remaining unwritten write data included in the write command rather than for the total write data included in the write command.

In step 503, microprocessor-based controller 133 causes some or all of the write data associated with the write command to be written to magnetic disk 110. For example, in situations in which a portion of the write data included in the write command have been written to flash memory device 135, only the remaining portion of the write data are written to magnetic disk 110 in step 503.

In step 504, microprocessor-based controller 133 selects the first unwritten LBA of the write command received in step 501.

In step 505, microprocessor-based controller 133 determines whether a quantity of data that are 1) associated with the sequential write stream that includes the write command and 2) have been written to flash memory device 135 is less than a predetermined threshold, for example 5 MB of data, 10 MB of data, etc. As described above, the predetermined threshold can be employed in a cache policy to indicate when data in a sequential read or write stream is stored in flash memory 135 or on magnetic disk 110. Thus, when the quantity of data satisfying conditions (1) and (2) is determined to be less than the predetermined threshold, method 500 proceeds to step 511 (writing data to cache). Conversely, when the quantity of data satisfying conditions (1) and (2) is determined to be greater than or equal to the predetermined threshold, method 500 proceeds to step 506 (writing data to disk). A counter for determining that condition (2) is satisfied is described in step 512.

In step 506, microprocessor-based controller 133 determines whether previously written data are stored in flash memory device 135 that are associated with the LBA selected in step 504. For example, microprocessor-based controller 133 may employ a B-tree or other data structure for mapping LBAs to memory locations storing data associated with the LBAs. If there are previously written data stored in flash memory device 135 that are associated with the LBA selected in step 504, method 500 proceeds to step 511. If there are no data stored in flash memory 135 that are associated with said LBA, method 500 proceeds to step 507.

In step 507, microprocessor-based controller 133 causes write data associated with the LBA selected in step 504 to be written to magnetic disk 110. It is noted such write data is written to magnetic disk 110 when two conditions have been met: 1) no previously written data are stored in flash memory device 135 that are associated with the LBA selected in step 504, and 2) the total quantity of data (from the current sequential write stream) that have been written to flash memory device 135 is greater than or equal to the above-described predetermined threshold.

In step 511, microprocessor-based controller 133 causes write data associated with the LBA selected in step 504 to be written to flash memory device 135. In some embodiments, said write data are immediately written to physical locations in flash memory device 135. In other embodiments, said data are buffered until a sufficient quantity of write data (e.g., 8 KB, 32 KB, etc.) is accumulated to facilitate the writing of a complete physical memory block in flash memory device 135 in one operation. In some embodiments, an eviction and/or garbage collection scheme may be implemented by flash manager device 136 before, during, and/or after step 511 to provide storage space in flash memory device 135 for write data.

In step 512, microprocessor-based controller 133 adds the quantity of write data written in step 511 to a total quantity of data (from the current sequential write stream) that have been written to flash memory device 135. This total quantity of data is used in step 505 to determine whether data associated with a subsequently selected LBA are written to flash memory device 135 or to magnetic disk 110.

In step 513, microprocessor-based controller 133 determines whether there is a remaining unwritten portion of data associated with the write command received in step 501. If there are no remaining data associated with the write command, method 500 proceeds to step 520 and terminates. If there are remaining data associated with the write command, method 500 proceeds back to step 502.

As described above, a cache policy commonly employed in hybrid drives involves storing in cache only an initial portion of a sequential read or write stream received from a host, with the remainder of either stream being stored on disk. One drawback to such a policy is that in some situations, data associated with the last few LBAs of a write command may not be aligned with a physical disk sector of the magnetic disk. In other words, the last LBAs of the write command may only occupy a portion of a physical disk sector, rather than, for example, all four KB of the physical disk sector. Consequently, a subsequent write command to the same LBAs may involve a read from disk before the write command can be completed, thereby introducing significant delay in completion of the write command. One such scenario is illustrated in FIGS. 6A-6D.

FIGS. 6A-6D are conceptual illustrations of a range of LBAs for which associated data are stored in hybrid drive 100 or any other hybrid drive that includes a flash memory device and a magnetic disk. Each of LBAs 0-31 is associated with and serves as the address for a block of data that is stored in hybrid drive 100, such as a 512-byte host sector or other-sized block of data. As shown, data associated with a particular LBA of hybrid drive 100 can be stored in three locations: RAM 134 (denoted "DRAM"), flash memory device 135 (denoted "cache"), and/or magnetic disk 110 (denoted "disk").

FIG. 6A illustrates LBAs 0-31 after a sequential write command is received from host 10, resulting in data associated with LBAs 0-25 being stored in DRAM. The write command includes a head portion 601 (LBAs 0-7), a middle portion 602 (LBAs 8-23), and a tail portion 603 (LBAs 24-25), and spans four physical disk sectors 611-614 on magnetic disk 110. Thus, in the example illustrated in FIGS. 6A-6D, each of physical disk sectors 611-614 spans 8 logical sectors of 512 bytes, for a total size of 4 KB. Head portion 601 includes the data that are to be stored in flash memory device 135, i.e., the initial portion of the sequential write command received from host 10. Middle portion 602 includes data that are to be stored on magnetic disk 110, and tail portion 603 includes data associated with LBAs that correspond to the last physical disk sector spanned by the sequential write command (i.e., physical disk sector 614), which are also to be stored on magnetic disk 110. It is noted that previous data 605 associated with LBAs 0-31 are already stored on disk, but once the write command is received and the data associated therewith are stored in flash memory device 135 and/or on magnetic disk 110, data that were previously stored on magnetic disk 110 associated with LBAs 0-25 are no longer the most recent version of data associated with these LBAs. Data associated with LBAs that are overlapped by LBAs included in the write command and are not sent to the flash memory device 135 are considered invalid in flash memory device 135 and are overwritten on magnetic disk 110.

The quantity of data included in head portion 601 may be a predetermined value, such as 1 or 2 MBs of data. For clarity, in the example illustrated in FIGS. 6A-6D, this predetermined value is illustrated as only 4 KB, so that an entire sequential write command can be viewed. In some embodiments, the quantity of data included in head portion 601 may be variable, so that head portion 601 terminates at a physical sector boundary, for example the boundary between physical disk sector 611 and physical disk sector 612. In this way, middle portion 602 begins at a physical sector boundary, so that the first LBA of middle portion 602 is aligned with a physical disk sector boundary and data associated with the LBAs of middle portion 602 can be written to one or more complete physical disk sectors rather than to a partial physical disk sector.

FIG. 6B illustrates LBAs 0-31 after a portion of the write command has been executed. As shown, data associated with head portion 601 of the write command (LBAs 0-7) are written to flash memory device 135, and data associated with middle portion 602 of the write command (LBAs 8-23) are written to magnetic disk 110. However, data associated with tail portion 603 of the write command (LBAs 24-25) are not yet written, since the LBAs associated with tail portion 603 correspond to only a portion of the LBAs of physical disk sector 614 and not the LBAs in a remainder portion 614A of physical disk sector 614.

Because data are generally written to magnetic disk 110 in units no smaller than a complete physical disk sector, data associated with all LBAs of physical disk sector 614 are first read into RAM 134 and then written to physical disk sector 614. Specifically, data associated with LBAs 24-25 are accepted into RAM 134 when the write command is received by hybrid drive 100, and data associated with LBAs 26-31 are read into RAM 134 by reading LBAs 26-31 from either flash memory device 135 (if stored therein) or from magnetic disk 110. In the scenario depicted in FIGS. 6A-6D, the most recent (and only) version of data associated with LBAs 26-31 is stored on magnetic disk 110. Thus, in order to write tail portion 603 of the write command to physical disk sector 614, the data from LBAs 26-31 on magnetic disk 110 are read into RAM 134 from magnetic disk 110 (as illustrated in FIG. 6C), magnetic disk 110 completes a rotation, and then the data for LBAs 24-25 and LBAs 26-31 are written to physical disk sector 614 from RAM 134 (as illustrated in FIG. 6D). Consequently, there is a significant delay (for example on the order of 10 s of milliseconds) in writing tail portion 603 of the write command when tail portion 603 is not aligned with the boundaries of physical disk sector 614.

In some embodiments, a cache policy may be implemented in hybrid drive 100 that stores in flash memory device 135 a tail portion of a write command that is not aligned with a physical disk sector of magnetic disk 110. In such embodiments, a subsequent write command that includes the tail portion that is not aligned with a physical disk sector can be executed without the read-from-disk delay described above in conjunction with FIGS. 6A-6D. One such scenario is illustrated in FIGS. 7A-7D.

FIGS. 7A-7D are conceptual illustrations of a range of LBAs for which associated data are stored in hybrid drive 100 or any other hybrid drive that includes a flash memory device and a magnetic disk. As described above in conjunction with FIGS. 6A-6D, data associated with a particular LBA of hybrid drive 100 can be stored in three locations: RAM 134, flash memory device 135, and/or magnetic disk 110.

Figure 7A:
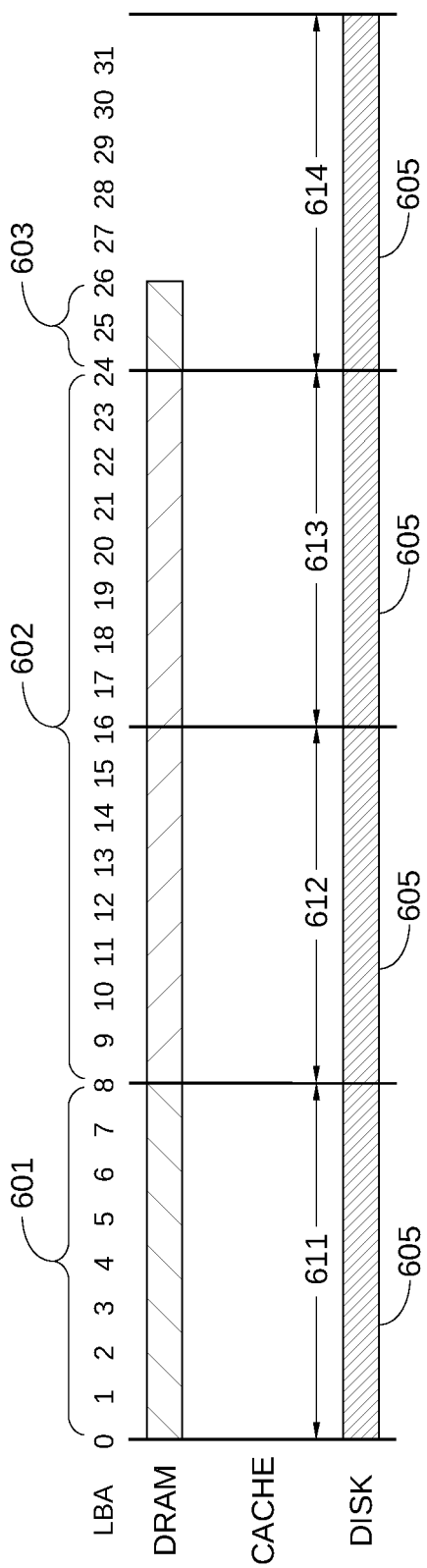
FIGS. 7A-7D are conceptual illustrations of a range of LBAs for which associated data are stored in a hybrid drive that includes a flash memory device and a magnetic disk.

FIG. 7A illustrates LBAs 0-31 after a sequential write command is received from host 10, resulting in data associated with LBAs 0-25 being stored in DRAM. The write command includes head portion 601 (LBAs 0-7), middle portion 602 (LBAs 8-23), and tail portion 603 (LBAs 24-25), and spans four physical disk sectors 611-614 on magnetic disk 110. It is noted that previous data 605 associated with LBAs 0-31 are already stored on disk, but once the write command is received and written to flash memory device 135 or magnetic disk 110, previous data associated with LBAs 0-25 are no longer the most recent version of data associated therewith, and are considered invalid or are overwritten.

Figure 7B:
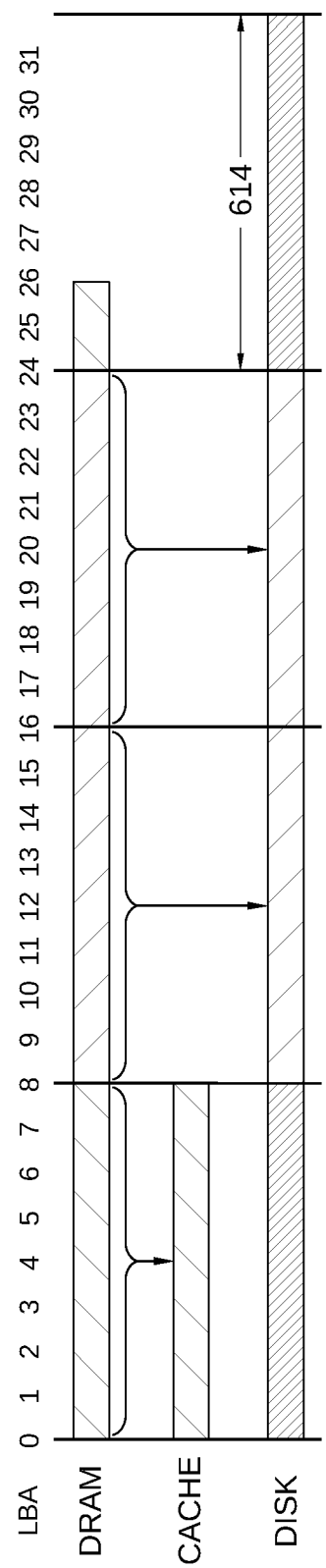
Figure 7C:
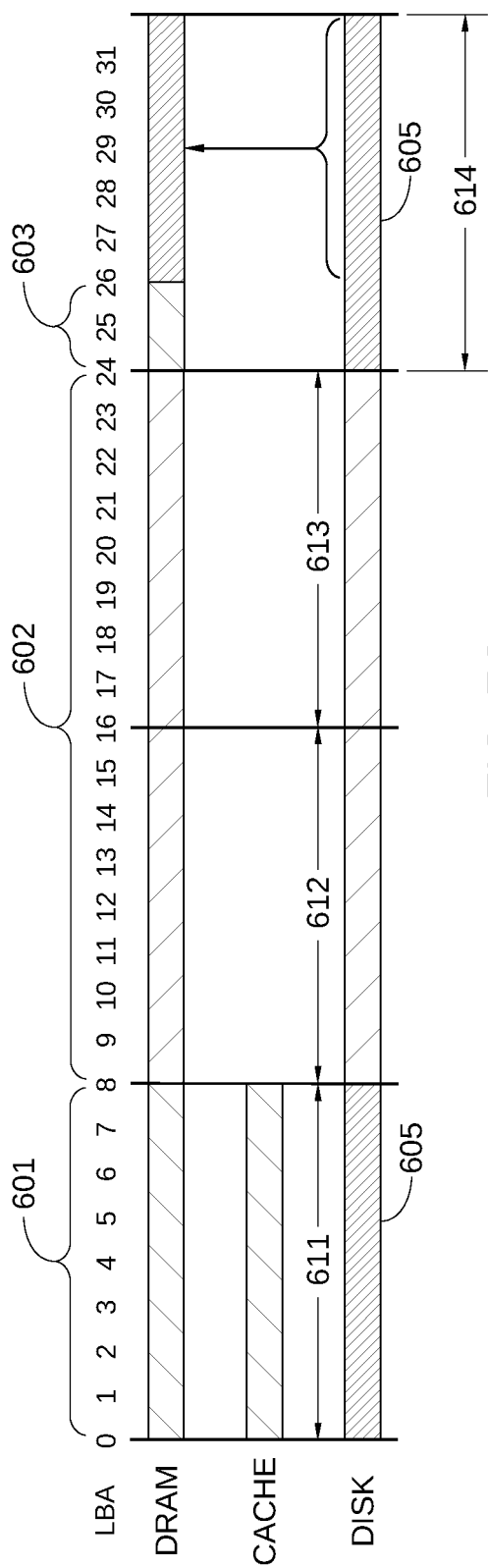
Figure 7D:
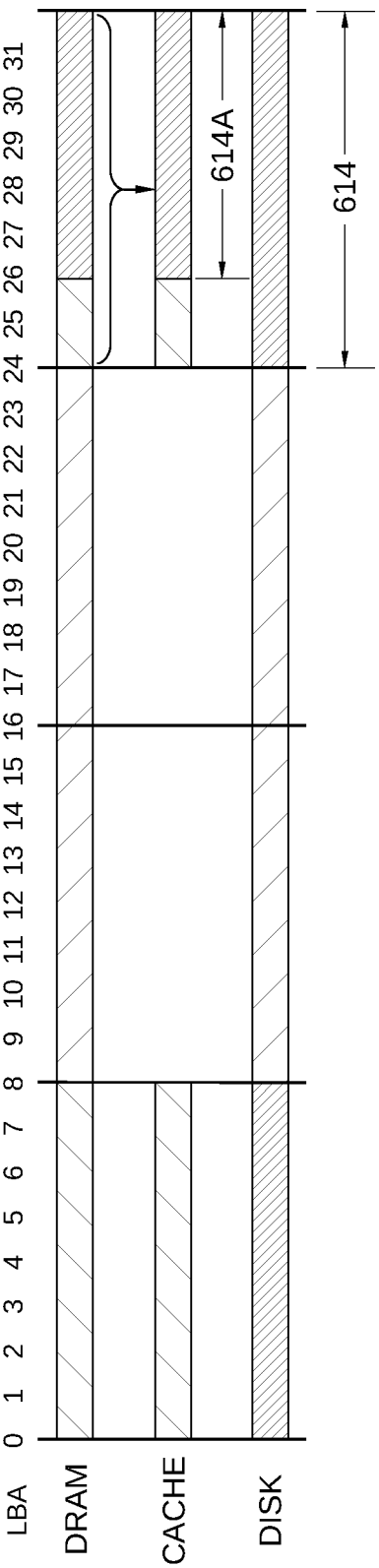

FIG. 7B illustrates LBAs 0-31 after a portion of the write command has been executed, with data associated with head portion 601 of the write command stored in flash memory device 135, and data associated with middle portion 602 of the write command stored on magnetic disk 110. Data associated with tail portion 603 of the write command are not yet written. FIG. 7C illustrates LBAs 0-31 after data associated with LBAs 26-31 are read from magnetic disk 110 and written to RAM 134. FIG. 7D illustrates LBAs 0-31 upon completion of the write command, i.e., after data associated with LBAs 24-31 are written to physical memory locations in flash memory device 135 that are mapped to LBAs corresponding to physical disk sector 614. Consequently, if a subsequent write command includes revised data associated with the LBAs of tail portion 603 but not with the LBAs of remainder portion 614A, the subsequent write command can still be completed without a read from magnetic disk 110. Instead, the subsequent write command can be completed in the same rotation that middle portion 602 is written to magnetic disk 110, since the write data associated with tail portion 603 the most recent version of data associated with remainder portion 614A are already available without reading data from magnetic disk 110. This is because the write data associated with tail portion 603 are received into RAM 134 as part of the write command and the most recent version of data associated with remainder portion 614A is already stored in RAM 134 and/or in the flash memory device 135.

In some embodiments, the write data associated with tail portion 603 are also written to physical disk sector 614 of magnetic disk 110, i.e., immediately after write command data are written to physical disk sector 613. Because the most recent version of data associated with remainder portion 614A is stored in flash memory device 135 and is already available for the writing, the new data associated with tail portion 603 can be written to physical disk sector 614 without the time delay associated with reading data from remainder portion 614A of physical disk sector 614.

Figure 8:
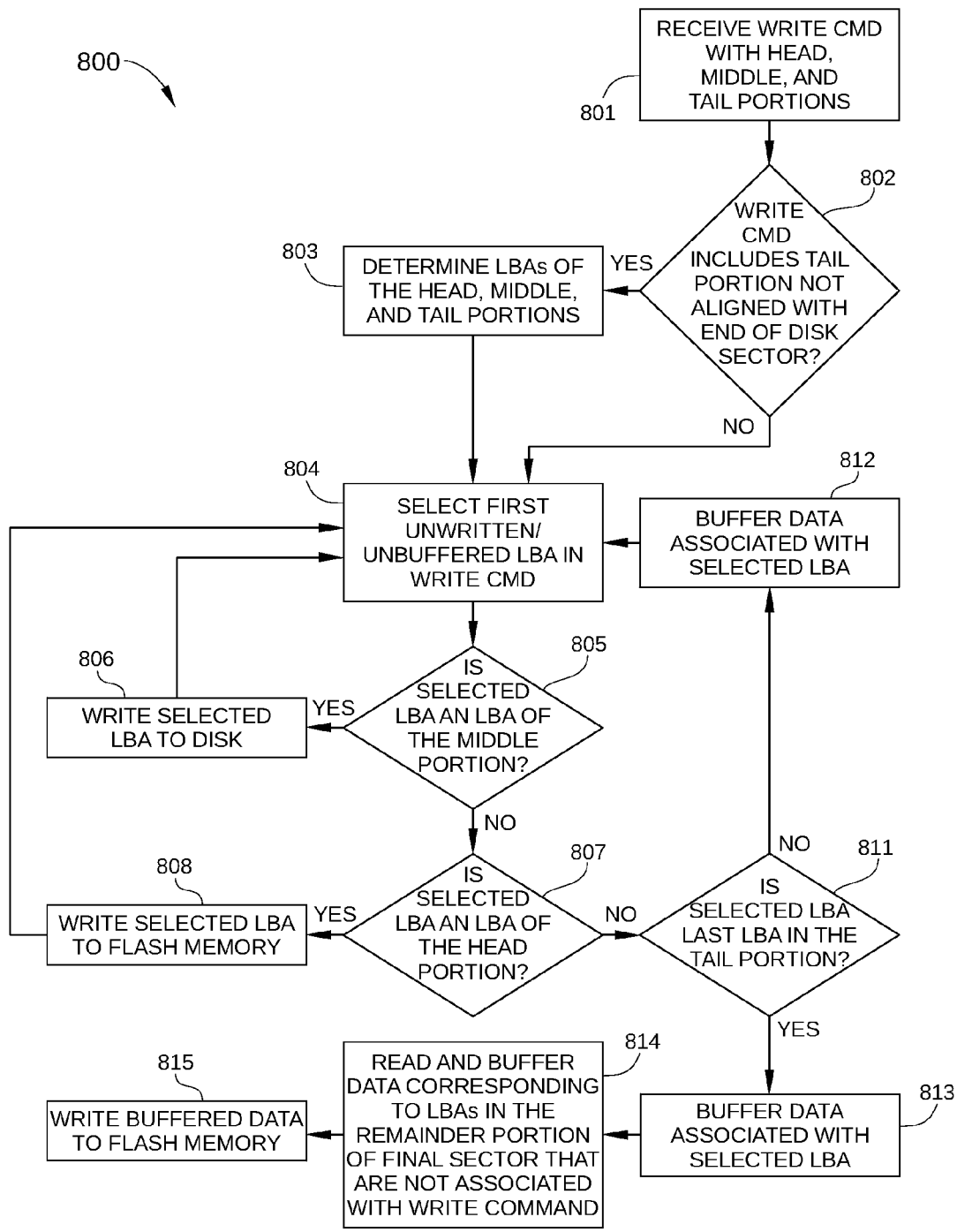
FIG. 8 sets forth a flowchart of method steps for performing a write operation in a hybrid drive according to an embodiment.

FIG. 8 sets forth a flowchart of method steps for performing a write operation in a hybrid drive according to an embodiment. Although the method steps are described in conjunction with hybrid drive 100 in FIGS. 1-2, persons skilled in the art will understand the method steps may be performed with other types of systems. While described below as performed by microprocessor-based controller 133, control algorithms for the method steps may reside in and/or be performed by any other suitable control circuit, system, or software or firmware construct associated with hybrid drive 100.

As shown, a method 800 begins at step 801, where microprocessor-based controller 133 receives a write command that includes head portion 601, middle portion 602, and tail portion 603 from host 10. The write command so received may be a sequential write stream (i.e., a write stream in which the write commands making up the write stream form a group of sequential LBAs). In some embodiments, microprocessor-based controller 133 receives the write command into RAM 134. In step 802, microprocessor-based controller 133 determines if tail portion includes LBAs that do not align with the end of a physical disk sector, as illustrated in FIGS. 6A and 7A. In step 803, microprocessor-based controller 133 determines the LBAs of head portion 601, middle portion 602, and tail portion 603. In step 804, microprocessor-based controller 133 selects the first unwritten and unbuffered LBA in the write command. In step 805, microprocessor-based controller 133 determines whether the selected LBA is an LBA of middle portion 602. If yes, method 800 proceeds to step 806, if no, method 800 proceeds to step 807.

In step 806, microprocessor-based controller 133 writes the data associated with the selected LBA to magnetic disk 110. Because data associated with a single LBA generally cannot be written to magnetic disk 110, steps 804 and 805 are generally repeated until sufficient data from middle portion 602 are buffered so that data sufficient to fill a single physical disk sector can be stored on magnetic disk 110 in step 806. It may also be advantageous to buffer all of the middle portion in RAM 134 before writing the data to the disk (in order to avoid taking multiple revolutions to write data that spans a track or less).

In step 807, microprocessor-based controller 133 determines whether the selected LBA is an LBA of head portion 601. If yes, method 800 proceeds to step 808, if no, method 800 proceeds to step 811. In step 808, microprocessor-based controller 133 writes the data associated with the selected LBA to flash memory device 135. Because data associated with a single LBA generally cannot be written to flash memory device 135, steps 804 and 807 are generally repeated until sufficient data from middle portion 602 are buffered and data sufficient to fill a single physical disk sector can be stored on magnetic disk 110.

In step 811, microprocessor-based controller 133 determines whether the selected LBA is the last LBA of the write command received in step 801. If yes, method 800 proceeds to step 813. If no, method 800 proceeds to step 812. In step 812, microprocessor-based controller 133 buffers the write data associated with the selected LBA in RAM 134 and method 800 proceeds back to step 804. In step 813, microprocessor-based controller 133 determines microprocessor-based controller 133 buffers the write data associated with the selected LBA in RAM 134 and method 800 proceeds to step 814.

In step 814, microprocessor-based controller 133 reads and buffers data corresponding to LBAs in the remainder portion of the final sector of the write command (i.e., remainder portion 614A). These data are not associated with the write command received in step 801, and therefore are read from one of several storage locations in hybrid drive 100. Generally, the data corresponding to LBAs in remainder portion 614A are read from flash memory device 135, when stored therein. In some embodiments, microprocessor-based controller 133 is configured to first determine if the most recent version of data corresponding to LBAs in remainder portion 614A are stored in RAM 134. According to some embodiments, the data associated with remainder portion 614A are stored in flash memory device 135 in response to a previous write command, as described above in conjunction with FIGS. 7A-7D. However, if said data are not stored in RAM 134 or flash memory device 135, microprocessor-based controller 133 causes the data corresponding to LBAs in remainder portion 614A to be read from magnetic disk 110.

In step 815, microprocessor-based controller 133 writes the data buffered in steps 812, 813, and 814 to flash memory 135. Thus, data associated with tail portion 603 and remainder portion 614A are both stored in flash memory device 135, even though the data associated with remainder portion 614A are not associated with the write command received in step 801.

Figure 9:
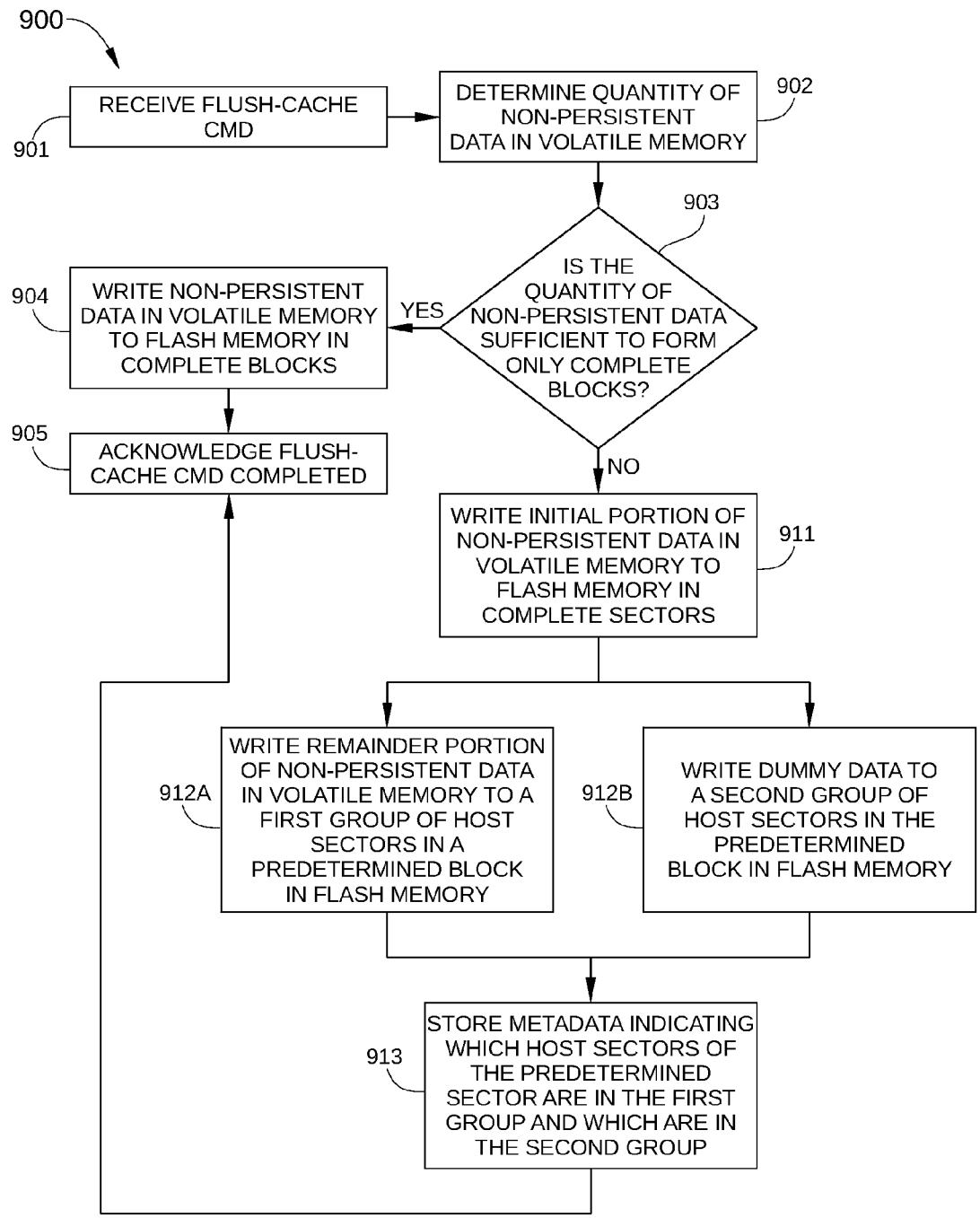
FIG. 9 sets forth a flowchart of method steps in a hybrid drive for responding to a flush-cache command, according to an embodiment.

FIG. 9 sets forth a flowchart of method steps in a hybrid drive for responding to a flush-cache command, according to an embodiment. Although the method steps are described in conjunction with hybrid drive 100 in FIGS. 1-2, persons skilled in the art will understand the method steps may be performed with other types of systems. While described below as performed by microprocessor-based controller 133, control algorithms for the method steps may reside in and/or be performed by any other suitable control circuit, system, or software or firmware construct associated with hybrid drive 100.

As shown, a method 900 begins at step 901, where microprocessor-based controller 133 receives a flush-cache command, for example from host 10. Generally, host 10 issues a flush-cache command to a storage device so that all data that have been received from host 10 up to that point are stored in a persistent state, i.e., on disk and/or in flash memory. Typically, the storage device performs essentially no other operations until all data received from host 10 are so stored, consequently, performance of a storage device is improved when the response to a flush-cache command is completed more quickly.

In step 902, microprocessor-based controller 133 determines the quantity of "non-persistent data" currently stored in RAM 134, i.e., data that are not stored elsewhere in a persistent state. For example, non-persistent data may include previously received write data that are not yet stored on magnetic disk 110 or in flash memory device 135.

In step 903, microprocessor-based controller 133 determines whether the quantity of non-persistent data currently stored in RAM 134 is sufficient to form only complete addressable blocks of data. For example, when magnetic disk 110 is organized into 4-KB physical disk sectors that can include eight 512-byte host sectors (such as physical disk sectors 611-614 in FIG. 6A), microprocessor-based controller 133 determines whether the non-persistent data currently stored in RAM 134 can be organized into complete 4-KB data blocks for storage in flash memory device 135. This is because a 4-KB block of data is the smallest writable and addressable data block in hybrid drive 100 in this scenario. It is noted that a 4-KB physical disk sector is only one example. In other embodiments, microprocessor-based controller 133 may instead determine whether the non-persistent data currently stored in RAM 134 can be organized into a larger data blocks (e.g., 8-KB physical disk sectors), when such blocks are defined as the smallest writable and addressable unit of data in flash memory device 135.

In step 904, microprocessor-based controller 133 writes the non-persistent data stored in RAM 134 to flash memory device 135 in complete addressable units of data, such as physical disk sectors. In step 905, microprocessor-based controller 133 sends an acknowledgement message to host 10 that flush-cache operations are complete.

In step 911, microprocessor-based controller 133 writes an initial portion of non-persistent data stored in RAM 134 to flash memory device 135 in complete addressable units of data.

Figure 10A:
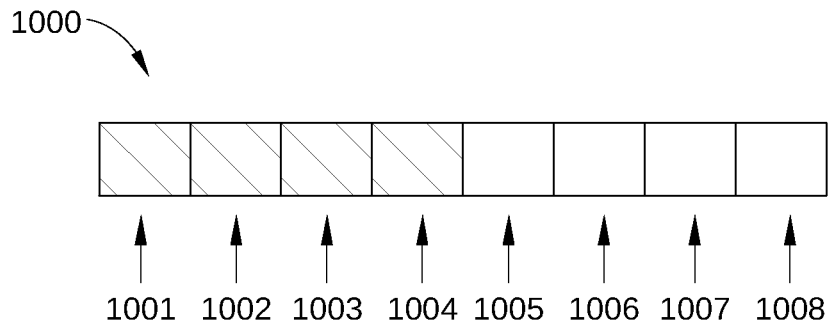
FIG. 10A-10C illustrate an addressable storage unit of a flash memory device after completion of a various methods step illustrated in FIG. 9.

In step 912A, microprocessor-based controller 133 writes a remainder portion of the non-persistent data stored in RAM 134 to a first group of host sectors in a predetermined block in flash memory device 135, such as an addressable storage unit. In one embodiment, the addressable storage unit is a 4-KB portion of flash memory device 135. Thus, in such an embodiment, in step 912A the remainder portion of the non-persistent data stored in RAM 134 is a quantity of data that is less than 4 KB. For example, when host 10 uses host sectors that correspond to 512 bytes of data, each addressable storage unit includes eight such host sectors, and in step 912A, microprocessor-based controller 133 writes one to seven host sectors of data to an addressable storage unit. One such embodiment is illustrated in FIG. 10A. FIG. 10A illustrates an addressable storage unit 1000 of flash memory device 135 after completion of step 912A. As shown, addressable storage unit 1000 includes eight host sectors 1001-1008, where host sectors 1001-1004 include the data written thereto in step 912A.

Figure 10B:
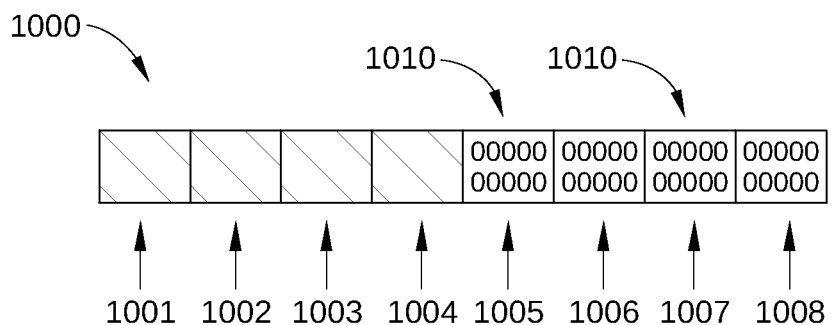
Figure 10C:
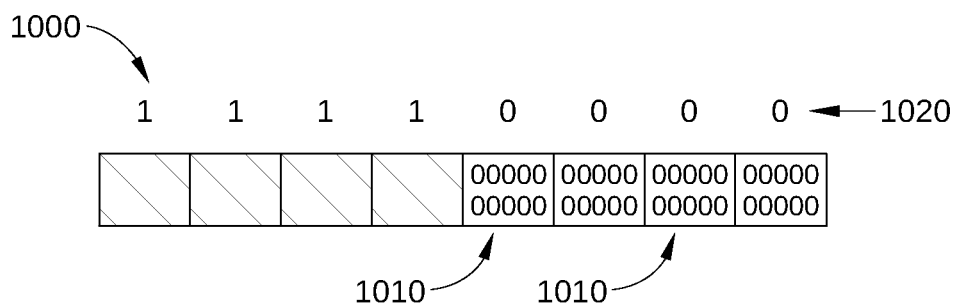

In step 912B, microprocessor-based controller 133 writes dummy data 1010 to a second group of host sectors in addressable storage unit 1000, as is illustrated in FIG. 10B. FIG. 10B illustrates addressable storage unit 1000 of flash memory device 135 after completion of step 912B. As shown, microprocessor-based controller 133 has written dummy data 1010 to host sectors 1005-1008, thereby filling addressable storage unit 1000. Although the data illustrated in FIGS. 10B and 10C shows an "all zeroes" pattern for simplicity, the microprocessor-based controller 133 may use a data-scrambling technique (as are known to one of ordinary skill in the art) to avoid writing a repetitive pattern to the flash memory device. While steps 912A and 912B have been described conceptually as two separate steps, in practice, an addressable storage unit is the smallest addressable, writable unit in hybrid drive 100, and data are written to all host sectors included in an addressable storage unit (i.e., host sectors 1001-1008) in a single write operation. Consequently, steps 912A and 912B occur simultaneously as a single write operation by microprocessor-based controller 133.

In step 913, microprocessor-based controller 133 stores metadata in flash memory device 135. This metadata indicate which of host sectors 1001-1008 of addressable storage unit 1000 store the remainder portion of the non-persistent data stored in RAM 134 and which of host sectors 1001-1008 store dummy data. For example, in one embodiment, a bit is associated with each of host sectors 1001-1008, and the metadata stored in step 913 includes the values of these bits for addressable storage unit 1000. One such embodiment is illustrated in FIG. 10C. FIG. 10C illustrates an addressable storage unit 1000 of flash memory device 135 after completion of step 913, in which metadata 1020 are stored in conjunction with the non-persistent data stored in RAM and dummy data 1010. In some embodiments, metadata 1020 may further include address information (e.g., LBA number) associated with each respective host sector of addressable storage unit 100 that includes non-persistent data from RAM 134.

Metadata 1020 allows data from addressable storage unit 1000 to be read after method 900 is performed in response to a flush-cache command. Thus, when the quantity of non-persistent data stored in RAM 134 is not sufficient to form only complete addressable blocks of data, microprocessor-based controller 133 does not perform a read from magnetic disk 110 to obtain data so that a complete addressable block of data is stored in response to the flush-cache command. Instead, non-persistent data insufficient to form a complete addressable block of data are stored in a particular portion of flash memory device 135 using method 900, thereby executing the flush-cache command without accessing magnetic disk 100. Subsequent to performing method 900, such as in a background process, microprocessor-based controller 133 can consolidate data stored in addressable storage unit 1000 with other data to be stored in flash memory device 135, to form a conventional addressable storage unit that is filled with stored data, does not include dummy data 1010, and can be accessed normally in flash memory device 135.

In some embodiments, addressable storage unit 1000 is a portion of flash memory device 135 that is specially configured for use during method 900. In such embodiments, flash memory device 135 may include multiple addressable storage units 1000. In addition, flash memory device 135 may also include registers or other memory devices for storing metadata 1020 associated with each of the multiple addressable storage units 1000.

In some embodiments, method 900 may be performed when hybrid drive 100 receives a write command from host 10, but then receives a flush-cache command from host 10 before completion of the write command. In such a situation, non-persistent data associated with the partially completed write command can be quickly stored in flash memory device 135, even when the write command ends with non-aligned data. Typically, when the write command ends with non-aligned data, as illustrated in FIGS. 6A-6D, a read from magnetic disk is executed in order to store non-persistent data in RAM 134 that does not completely fill an addressable storage unit, such as a physical disk sector. Method 900 allows non-persistent data to be stored directly to flash memory device 135 in response to a flush-cache command without the need of a relatively time-consuming read from magnetic disk 110.

In sum, embodiments described herein provide systems and methods for a cache policy in a hybrid drive having a magnetic storage device and a non-volatile solid-state device that includes a cache for the data storage device. The storage device is configured to write the most recent version of data associated with an LBA to the non-volatile solid-state device when the LBA is associated with previously written data and is overlapped by a subsequent disk write operation. Advantageously, the most recent version of data associated with the overlapped LBA is stored in cache, even when the subsequent disk write operation results in the overlapped LBA being trimmed from cache or otherwise invalidated. Consequently, data associated with the overlapped LBA can be accessed more quickly than data only written to the magnetic storage device.

While the foregoing is directed to embodiments of the present invention, other and further embodiments of the invention may be devised without departing from the basic scope thereof, and the scope thereof is determined by the claims that follow.

We claim:

1. A data storage device comprising:
a magnetic storage device;
a non-volatile solid-state device; and
a controller configured to process one or more write commands from a host that includes a range of logical block addresses, including a first portion of the range followed sequentially by a second portion of the range, and write data associated with the logical block addresses in the range by (i) storing write data associated with the logical block addresses in the first portion of the range in the non-volatile solid-state device, (ii) prior to writing write data associated with the logical block addresses in the second portion of the range, determining that previously written data associated with one or more logical block addresses in the second portion of the range are stored in the non-volatile solid-state device, and in response thereto storing the write data associated with the one or more logical block addresses in the non-volatile solid-state device and invalidating the previously written data associated with the one or more logical block addresses, and (iii) determining that previously written data associated with remaining logical block addresses in the second portion of the range are not stored in the non-volatile solid-state device, and in response thereto, storing the write data associated with the remaining logical block addresses in the magnetic storage device.

2. The data storage device of claim 1, wherein the write commands are parts of a sequential write stream.

3. The data storage device of claim 1, wherein the non-volatile solid-state device includes a cache for the data storage device.

4. The data storage device of claim 1, wherein the controller is further configured to determine that there is sufficient storage space available in the non-volatile solid-state device for the write data associated with the logical block addresses to be stored therein, and to store the write data associated with the logical block addresses in the non-volatile solid-state device upon determining that there is sufficient storage space.

5. The data storage device of claim 1, wherein the range of logical block addresses includes a third portion that sequentially follows the second portion.

6. A method of operating a storage device having a magnetic storage device and a non-volatile solid-state device, the method comprising:
receiving one or more write commands from a host that includes a range of logical block addresses, including a first portion of the range followed sequentially by a second portion of the range, and write data associated with the logical block addresses in the range;
storing write data associated with the logical block addresses in the first portion of the range in the non-volatile solid-state device;
prior to writing write data associated with the logical block addresses in the second portion of the range, determining that previously written data associated with one or more logical block addresses in the second portion of the range are stored in the non-volatile solid-state device, and in response thereto, storing the write data associated with the one or more logical block addresses in the non-volatile solid-state device and invalidating the previously written data associated with the one or more logical block addresses; and
determining that previously written data associated with remaining logical block addresses in the second portion of the range are not stored in the non-volatile solid-state device, and in response thereto, storing the write data associated with the remaining logical block addresses in the magnetic storage device.

7. The method of claim 6, wherein the write commands are parts of a sequential write stream.

8. The method of claim 6, wherein the non-volatile solid-state device includes a cache for the method.

9. The method of claim 6, further comprising determining that there is sufficient storage space available in the non-volatile solid-state device for the write data associated with the logical block addresses to be stored therein, and storing the write data associated with the logical block addresses in the non-volatile solid-state device upon determining that there is sufficient storage space.

10. The method of claim 6, wherein the range of logical block addresses includes a third portion that sequentially follows the second portion.

* * * * *